US009338425B2

(12) United States Patent
Matsumoto et al.

(10) Patent No.: US 9,338,425 B2
(45) Date of Patent: May 10, 2016

(54) DEVICE AND METHOD FOR GENERATING STEREOSCOPIC IMAGE

(71) Applicant: PANASONIC CORPORATION, Osaka (JP)

(72) Inventors: Kentaro Matsumoto, Osaka (JP); Yuki Kobayashi, Osaka (JP); Yuki Maruyama, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 228 days.

(21) Appl. No.: 13/657,267

(22) Filed: Oct. 22, 2012

(65) Prior Publication Data
US 2013/0044191 A1 Feb. 21, 2013

Related U.S. Application Data

(63) Continuation of application No. PCT/JP2012/002495, filed on Apr. 10, 2012.

(30) Foreign Application Priority Data

Jun. 10, 2011 (JP) ................................. 2011-129894

(51) Int. Cl.
H04N 13/00 (2006.01)
H04N 13/02 (2006.01)
(52) U.S. Cl.
CPC ....... *H04N 13/0014* (2013.01); *H04N 13/0221* (2013.01); *H04N 13/0282* (2013.01); *H04N 2213/007* (2013.01)
(58) Field of Classification Search
CPC .......... H04N 13/0014; H04N 13/0221; H04N 13/0282; H04N 2213/007
See application file for complete search history.

(56) References Cited

U.S. PATENT DOCUMENTS 5,825,997 A * 10/1998 Yamada ............. H04N 13/0055
345/419
7,463,305 B2 12/2008 Wada
7,873,207 B2 1/2011 Tsubaki
(Continued)

FOREIGN PATENT DOCUMENTS

JP 09-238368 A 9/1997
JP 2002-077948 A 3/2002
(Continued)

OTHER PUBLICATIONS

International Search Report issued in International Patent Application No. PCT/JP2012/002495 dated Jun. 19, 2012.

*Primary Examiner* — Behrooz Senfi
*Assistant Examiner* — Maria Vazquez Colon
(74) *Attorney, Agent, or Firm* — McDermott Will & Emery LLP

(57) ABSTRACT

A rotation angle obtaining unit obtains an angle by which a stereoscopic image of a subject is to be rotated around a line-of-sight direction. A multi-viewpoint image accumulation unit accumulates a plurality of images of the subject obtained in one direction by changing capturing positions, as multi-viewpoint images. A selection unit selects base images for the stereoscopic image from the multi-viewpoint images accumulated in the multi-viewpoint image accumulation unit, based on the rotation angle. A rotation unit rotates the selected base images based on the rotation angle to generate images which are to form the stereoscopic image of the subject.

6 Claims, 7 Drawing Sheets

(56) References Cited

U.S. PATENT DOCUMENTS

| | | | |
|---|---|---|---|
| 8,441,521 B2* | 5/2013 | Kim et al. | 348/51 |
| 2003/0185435 A1* | 10/2003 | Imai | G06T 17/10 |
| | | | 382/154 |
| 2004/0141089 A1* | 7/2004 | Wada | F16M 11/105 |
| | | | 348/375 |
| 2006/0257016 A1* | 11/2006 | Shioi | H04N 13/0029 |
| | | | 382/154 |
| 2011/0025825 A1 | 2/2011 | McNamer et al. | |
| 2012/0108328 A1* | 5/2012 | Konno | H04N 13/0497 |
| | | | 463/31 |

FOREIGN PATENT DOCUMENTS

| | | |
|---|---|---|
| JP | 2003-289552 A | 10/2003 |
| JP | 2004-198732 A | 7/2004 |
| JP | 2004-248231 A | 9/2004 |
| JP | 2005-049999 A | 2/2005 |
| JP | 2007-047294 A | 2/2007 |
| JP | 2010-072477 A | 4/2010 |
| JP | 2010-206495 A | 9/2010 |
| JP | 2011199556 A | 10/2011 |

* cited by examiner

DEVICE AND METHOD FOR GENERATING STEREOSCOPIC IMAGE

CROSS-REFERENCE TO RELATED APPLICATIONS

This is a continuation of PCT International Application PCT/JP2012/002495 filed on Apr. 10, 2012, which claims priority to Japanese Patent Application No. 2011-129894 filed on Jun. 10, 2011. The disclosures of these applications including the specifications, the drawings, and the claims are hereby incorporated by reference in their entirety.

BACKGROUND

The present disclosure relates to image generation devices for generating a stereoscopic image using an image for the left eye and an image for the right eye, and more particularly, to a stereoscopic image generation device which can generate a more suitable stereoscopic image when a rotated version of the stereoscopic image is displayed.

Japanese Patent Publication No. 2010-206495 describes a technique of displaying a rotated version of a stereoscopic image, in which when the stereoscopic image is rotated by 180 degrees, an image for the left eye (left-eye image) and an image for the right eye (right-eye image) are exchanged (i.e., the left-eye image is used as a new right-eye image while the right-eye image is used as a new left-eye image) to generate the 180-degree rotated version.

Japanese Patent Publication No. 2002-77948 describes a technique of displaying a stereoscopic image using a set of rotation images which have been captured or shot at equiangularly spaced positions around a subject (i.e., on a 360-degree circle), whereby an image of the subject viewed from any position around the subject can be displayed by selecting a corresponding one from the set of rotation images.

SUMMARY

The technique of Japanese Patent Publication No. 2010-206495 can address the rotation of 180 degrees, but not rotations of other angles. The technique of Japanese Patent Publication No. 2002-77948 can display stereoscopic images when a viewpoint is moved around a subject, but not when a camera is rotated (i.e., around a line-of-sight direction) while a subject is viewed in one direction.

The present disclosure describes implementations of a technique of displaying a more suitable stereoscopic image of a subject when the subject is viewed in one direction, even if an angle at which the subject is displayed is arbitrarily changed.

An example stereoscopic image generation device of the present disclosure includes a multi-viewpoint image accumulation unit configured to accumulate a plurality of images of a subject obtained in one direction by changing capturing positions, as multi-viewpoint images, a rotation angle obtaining unit configured to obtain an angle by which a stereoscopic image of the subject is to be rotated around a line-of-sight direction, as a rotation angle, a selection unit configured to select at least two images as base images for the stereoscopic image, from the multi-viewpoint images accumulated in the multi-viewpoint image accumulation unit, based on the rotation angle obtained by the rotation angle obtaining unit, and a rotation unit configured to rotate the base images selected by the selection unit, based on the rotation angle, to generate images which are to form the stereoscopic image of the subject.

An example stereoscopic image generation method of the present disclosure includes a first step of obtaining an angle by which a stereoscopic image of a subject is to be rotated around a line-of-sight direction, as a rotation angle, a second step of selecting at least two images as base images for the stereoscopic image, from multi-viewpoint images which are a plurality of images of the subject obtained in one direction by changing capturing positions, based on the rotation angle obtained in the first step, and a third step of rotating the base images selected in the second step, based on the rotation angle, to generate images which are to form the stereoscopic image of the subject.

In the example stereoscopic image generation device and method, a plurality of images (multi-viewpoint images) of a subject obtained in one direction by changing capturing positions, are used. At least two images suitable as base images for a stereoscopic image are selected from the multi-viewpoint images, based on the rotation angle by which the stereoscopic image of the subject is to be rotated around the line-of-sight direction. The selected base images are rotated by the rotation angle to generate images for forming the stereoscopic image of the subject. Here, the suitable images refer to images having a natural parallax corresponding to the rotation angle when a rotated version of the stereoscopic image is displayed. As a result, even if a stereoscopic image is rotated around the line-of-sight direction and displayed, the stereoscopic image can have a natural parallax.

According to the present disclosure, when a stereoscopic image is rotated around the line-of-sight direction and displayed, a more suitable stereoscopic image can be displayed and generated.

DETAILED DESCRIPTION

Embodiments will be described in detail hereinafter, with reference to the accompanying drawings when necessary. Note that a detailed description more than necessary may be omitted. For example, well-known matter may not be described in detail and substantially the same parts may not be redundantly described. This is because the following description avoids being unnecessarily redundant, and those skilled in the art will easily understand the present disclosure.

Note that the present inventors provide the accompanying drawings and the following description in order to enable those skilled in the art to sufficiently understand the present disclosure, however, do not thereby intend to limit the subject matter of the claims.

Figure 1:
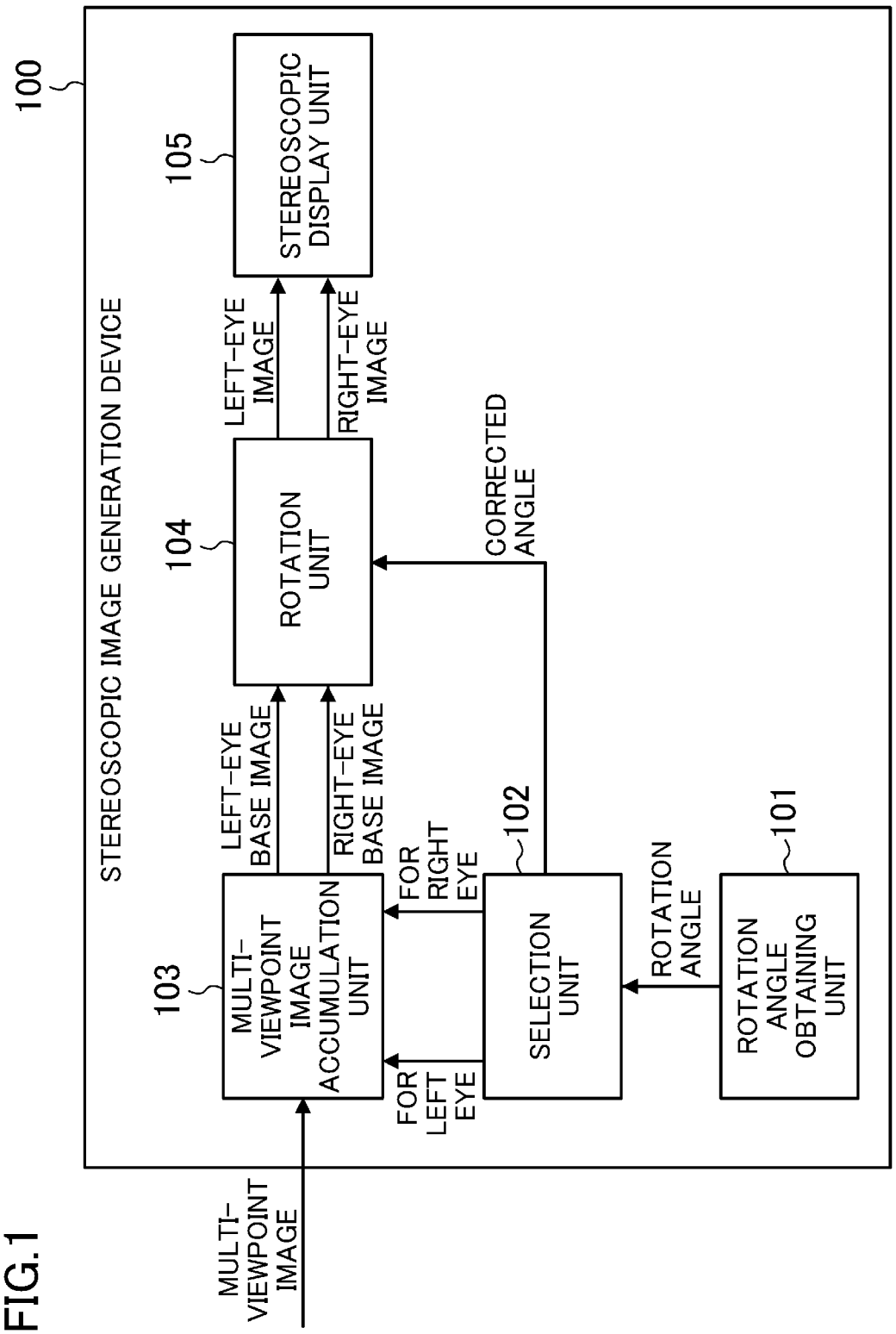
FIG. 1 is a diagram showing a functional configuration of a stereoscopic image generation device according to an embodiment.

FIG. 1 is a block diagram showing a functional configuration of a stereoscopic image generation device 100 according to an embodiment. The stereoscopic image generation device 100 of FIG. 1 includes a rotation angle obtaining unit 101, a selection unit 102, a multi-viewpoint image accumulation unit 103, a rotation unit 104, and a stereoscopic display unit 105.

The rotation angle obtaining unit 101 obtains a rotation angle by which a stereoscopic image of a subject is rotated around a line-of-sight direction. Here, the rotation angle may be, for example, an angle by which the stereoscopic image generation device 100 is actually rotated or an angle which is input by the user using an interface device etc. Alternatively, the rotation angle may be an angle in a parallax direction during viewing of the stereoscopic image. The angle in a parallax direction during viewing of the stereoscopic image may be obtained, for example, from stereoscopic glasses.

Based on the rotation angle obtained by the rotation angle obtaining unit 101, the selection unit 102 appropriately selects a left-eye base image and a right-eye base image for a stereoscopic image from a plurality of images (multi-viewpoint images) stored in the multi-viewpoint image accumulation unit 103. The selection unit 102 also outputs a corrected angle by which the left-eye base image and the right-eye base image are actually rotated, based on the rotation angle obtained by the rotation angle obtaining unit 101. Here, the output corrected angle is almost the same as the rotation angle obtained from the rotation angle obtaining unit 101. However, for example, when there is a difference between positions where the selected left-eye and right-eye base images have been captured or shot and ideal capturing or shooting positions after the rotation, the rotation angle is corrected based on the difference.

The multi-viewpoint image accumulation unit 103 accumulates a plurality of images of a subject which have been previously obtained. The accumulated images of the subject which have been captured at different positions (i.e., a plurality of images of the subject which have been captured in one direction at different positions) are accumulated as multi-viewpoint images in the multi-viewpoint image accumulation unit 103. In other words, the multi-viewpoint image accumulation unit 103 accumulates a plurality of images of the same subject captured from different viewpoints. Note that, in this embodiment, as an example, the multi-viewpoint images are externally input to the stereoscopic image generation device 100, but the present disclosure is not limited to this. When a target to be displayed as a stereoscopic image has been previously determined, the multi-viewpoint image accumulation unit 103 may accumulate only the images of the target.

Figure 2:
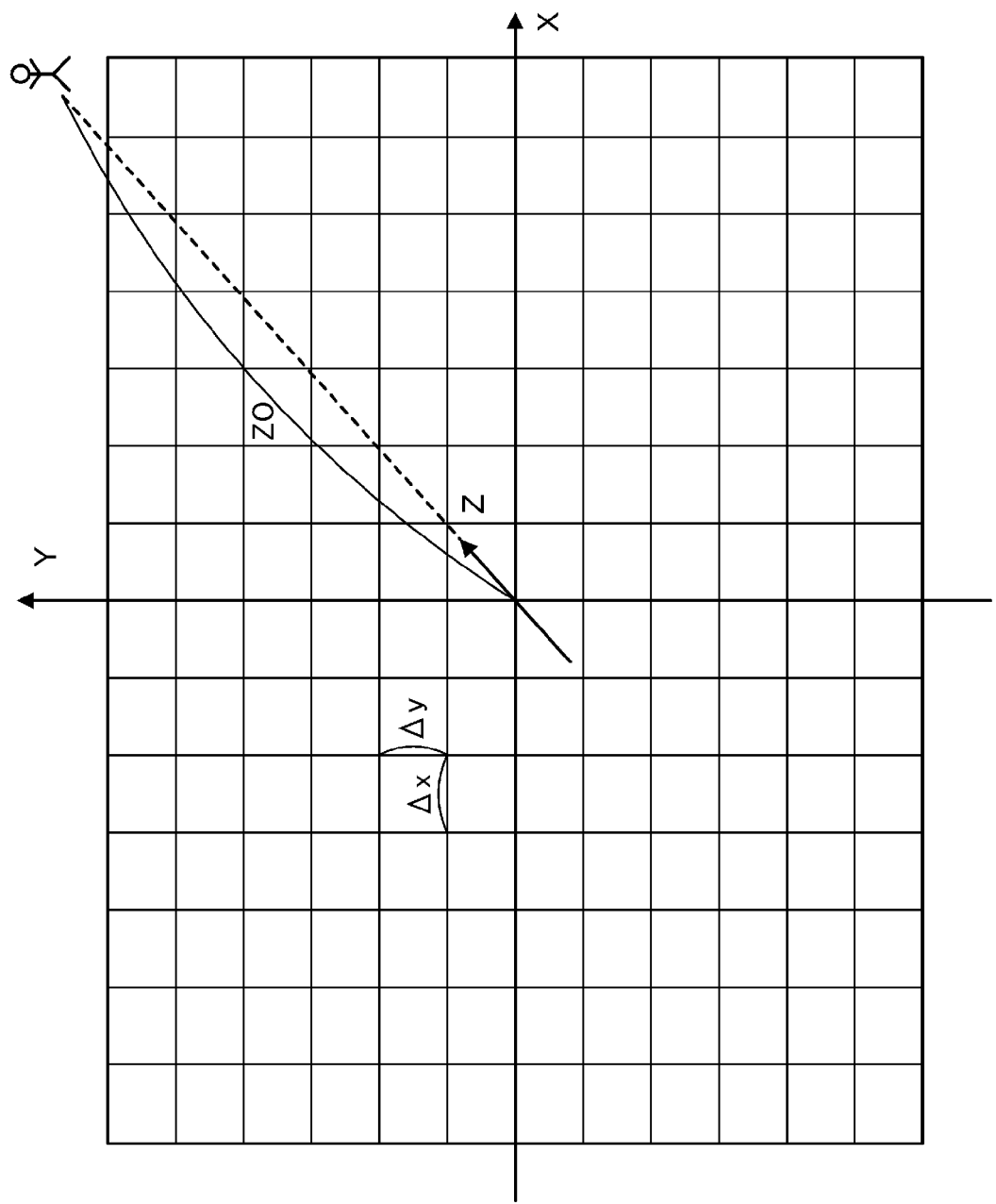
FIG. 2 is a diagram showing example capturing positions of multi-viewpoint images.

FIG. 2 is a diagram showing example positions at which multi-viewpoint images are captured. As shown in FIG. 2, in an XY plane from which a subject located in a Z-axis direction (normal direction) is viewed, a region including the origin which is a reference point corresponding to the location of the subject is divided into a grid pattern, and a capturing position is placed at each grid point. An image of the subject located at a distance of z0 from the XY plane is captured at each capturing position by a camera, and a plurality of captured images are accumulated as multi-viewpoint images. In other words, here, the multi-viewpoint images are captured at the capturing positions placed on the plane facing the subject, and the capturing positions are placed on the grid points.

In this case, all cameras preferably face in the same Z-axis direction, and all images captured by the cameras have a horizontal axis extending in the X-axis direction. In this case, information about the orientations of the cameras does not need to be stored separately. Not all camera operations or not all image horizontal axes need to be the same. However, in this case, information about the camera orientations or the image horizontal axes needs to be stored in a database separately, and captured images need to be corrected when necessary.

Grid spacings $\Delta x$ and $\Delta y$ may be arbitrarily determined. In order to achieve more appropriate rotations of a stereoscopic image, the spacings $\Delta x$ and $\Delta y$ are preferably reduced. Specifically, for example, the values of the spacings $\Delta x$ and $\Delta y$ are preferably set to values which are sufficiently smaller than 6.5 cm which is the pupillary distance for adults. Not all the grid points need to have a capturing position. In this embodiment, capturing positions are placed at a part of the grid points.

The rotation unit 104 rotates the left-eye and right-eye base images for a stereoscopic image which have been selected from the multi-viewpoint image accumulation unit 103 by the selection unit 102, based on the corrected angle determined by the selection unit 102. As a result, a left-eye image and a right-eye image for forming a stereoscopic image of the subject are generated.

The stereoscopic display unit 105 displays a stereoscopic image of the subject using the left-eye and right-eye images output from the rotation unit 104.

Figure 3:
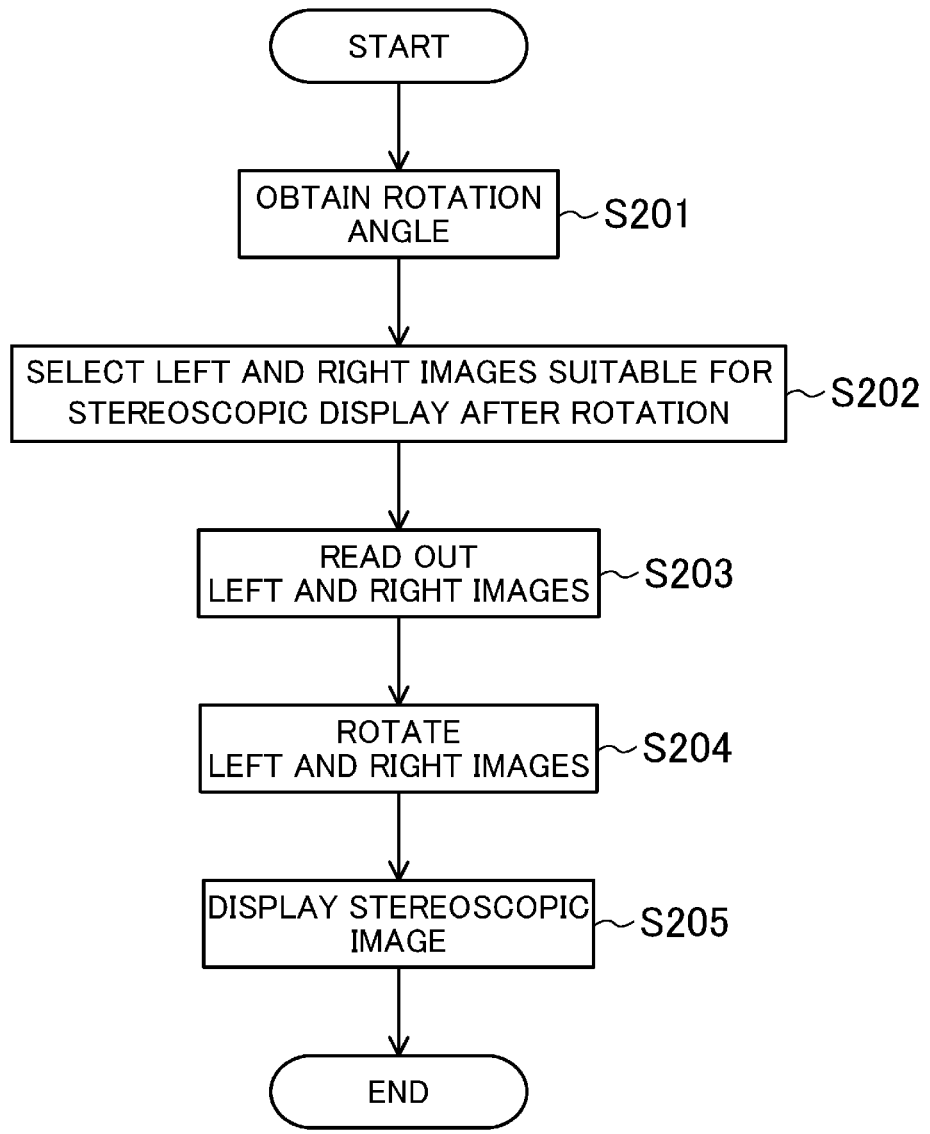
FIG. 3 is a flowchart of a control performed by the stereoscopic image generation device of the embodiment.

FIG. 3 is a flowchart of a process of displaying a rotated stereoscopic image in the stereoscopic image generation device 100 of FIG. 1. The process (control) of the stereoscopic image generation device 100 will be described hereinafter with reference to the flowchart of FIG. 3.

(Step S201) The rotation angle obtaining unit 101 obtains a rotation angle by which a stereoscopic image of a subject is to be rotated around the line-of-sight direction. Examples of a technique of obtaining the rotation angle include: (1) the user inputs a desired rotation angle using an external input device, such as a remote controller, a keyboard, etc., and the angle is obtained as the rotation angle; (2) a gyroscope, an angular velocity sensor, etc., is provided in an external device, the rotation angle is determined by rotating the body etc. of the external device, and the rotation angle is transferred to the rotation angle obtaining unit 101 via communications etc.; (3) a gyroscope, an angular velocity sensor, etc., is provided in the stereoscopic image generation device 100, and the rotation of the stereoscopic image generation device 100 itself is detected; and the like. The present disclosure is not limited to these techniques. The rotation angle obtaining unit 101 may obtain the rotation angle by other techniques.

(Step S202) Based on the rotation angle obtained by the rotation angle obtaining unit 101, the selection unit 102 selects, from the multi-viewpoint images accumulated in the multi-viewpoint image accumulation unit 103, two images suitable for display of a stereoscopic image having the rotation angle as a left-eye base image and a right-eye base image. Here, images having a parallax in the direction of the obtained rotation angle are selected as a left-eye base image and a right-eye base image. Specifically, if the rotation angle is zero degrees, two images having a parallax in the horizontal (lateral) direction are selected. This case is used as a reference. If the rotation angle is A degrees, two images having a parallax in a direction which is rotated by A degrees from the horizontal direction are selected. The control of the selection unit 102 will be described in detail below.

(Step S203) The multi-viewpoint image accumulation unit 103 reads out the left-eye and right-eye base images selected by the selection unit 102, from the multi-viewpoint images accumulated therein, and outputs the left-eye and right-eye base images to the rotation unit 104.

(Step S204) The rotation unit 104 rotates the left-eye and right-eye base images read from the multi-viewpoint image accumulation unit 103, based on a corrected angle determined by the selection unit 102, to generate a left-eye image and a right-eye image for forming the stereoscopic image of the subject.

(step S205) The stereoscopic display unit 105 displays the left-eye and right-eye images output from the rotation unit 104. The stereoscopic display unit 105, for example, alternately displays the left-eye image and the right-eye image in a frame sequential manner. The viewer uses active shutter glasses which are synchronous with the frame sequential display to perceive stereoscopic video. Note that stereoscopic video may be viewed by other manners: a polarized manner in which left-eye and right-eye images having different polarized directions are viewed using glasses; an autostereoscopic (glassesless) manner in which glasses are not used; and the like. This embodiment is not intended to be limited to any particular viewing manners or techniques.

Figure 4:
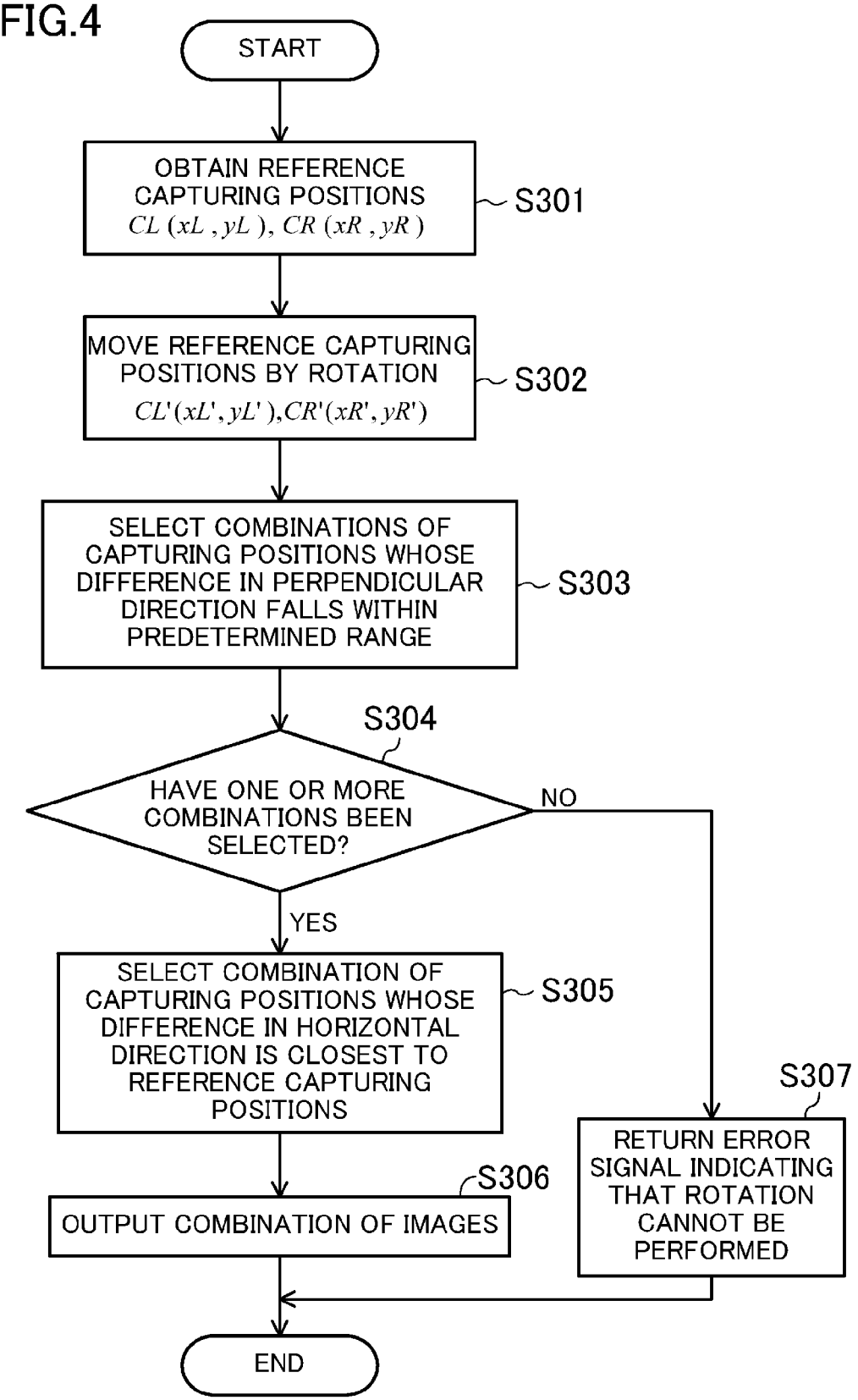
FIG. 4 is a flowchart of a control performed by a selection unit in the stereoscopic image generation device of the embodiment.

FIG. 4 is a flowchart for describing the process (control) of the selection unit 102 in greater detail. Here, if images captured at ideal capturing positions corresponding to the rotation angle are included in the multi-viewpoint images, the images may be selected. However, it is not realistic to previously prepare images captured at capturing positions corresponding to all rotation angles. Typically, it is considered that the ideal capturing position corresponding to the rotation angle is different from any of the actual capturing positions of the multi-viewpoint images. In this case, the selection unit 102 selects images having a natural parallax, with priority, in order to display a rotated stereoscopic image. Examples of a technique of selecting images having a natural parallax include various techniques: a technique of reducing a parallax in the vertical direction to the extent possible; a technique of maintaining a parallax in the horizontal direction at a similar level before rotation; a technique of reducing a difference between an actual rotation angle and the angle of selected images to the extent possible; and the like.

Figure 5:
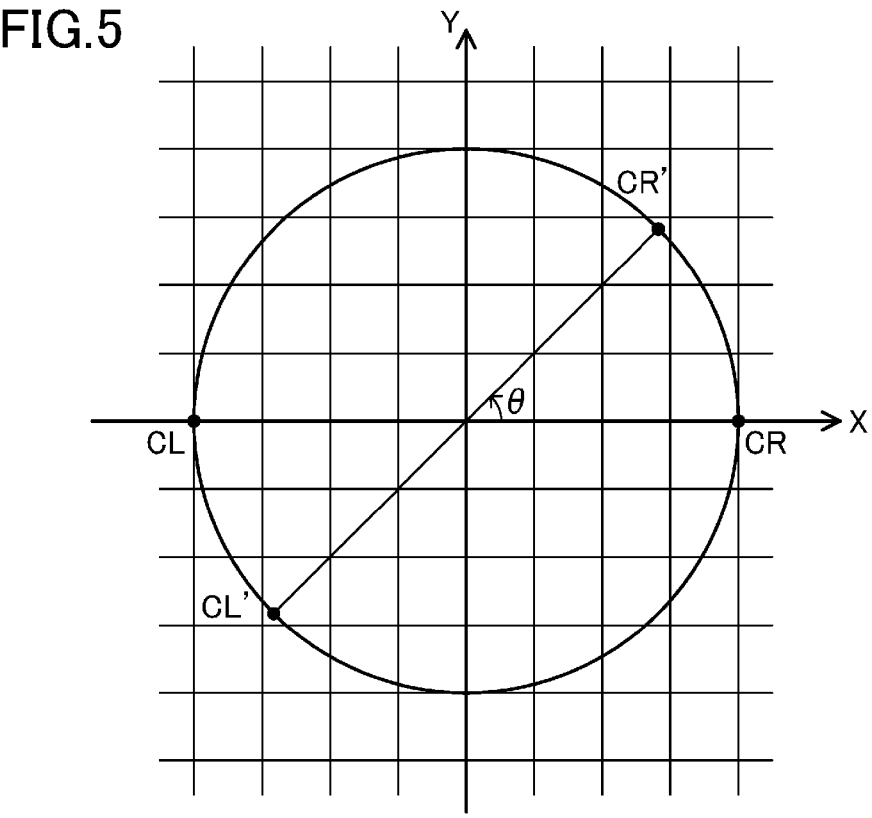
FIG. 5 is a conceptual diagram showing a relationship between a rotation angle and capturing positions of multi-viewpoint images.

(Step S301) The selection unit 102 determines capturing positions which are to be used as a reference before rotation. In this embodiment, for the sake of simplicity, as shown in FIG. 5, in the XY plane in which capturing positions are provided, capturing positions CL and CR on the X axis are defined as reference capturing positions for a left-eye image and a right-eye image, respectively. In this case, the intersection point (origin) of the X axis and the Y axis is a reference point corresponding to the location of a subject.

(Step S302) The selection unit 102 calculates ideal capturing positions after rotation based on the rotation angle obtained by the rotation angle obtaining unit 101.

Referring to FIG. 5, the reference capturing positions CL and CR before rotation are moved by rotation around the origin by a rotation angle of θ. As a result, ideal capturing positions CL' and CR' after rotation are obtained. Note that the distance between the camera and the subject is not changed.

Here, if a coordinate position (xn, yn) before rotation is moved by rotation around the origin by an angle of θ, the resulting coordinate position (xn', yn') is represented by:

$$\begin{pmatrix} xn' \\ yn' \end{pmatrix} = \begin{pmatrix} \cos\theta & -\sin\theta \\ \sin\theta & \cos\theta \end{pmatrix} \begin{pmatrix} xn \\ yn \end{pmatrix} \quad (1)$$

Therefore, if capturing positions before rotation are represented by CL (xL, yL) and CR (xR, yR), capturing positions CL' (xL', yL') and CR' (xR', yR') after rotation are represented by:

$$\begin{pmatrix} xL' \\ yL' \end{pmatrix} = \begin{pmatrix} \cos\theta & -\sin\theta \\ \sin\theta & \cos\theta \end{pmatrix} \begin{pmatrix} xL \\ yL \end{pmatrix} \quad (2)$$

$$\begin{pmatrix} xR' \\ yR' \end{pmatrix} = \begin{pmatrix} \cos\theta & -\sin\theta \\ \sin\theta & \cos\theta \end{pmatrix} \begin{pmatrix} xR \\ yR \end{pmatrix}$$

<Steps S303-S307> Based on the ideal capturing positions CL' and CR' after rotation, the selection unit 102 selects images suitable for stereoscopic image display from the multi-viewpoint images accumulated in the multi-viewpoint image accumulation unit 103. Specifically, if the images captured at the capturing positions CL' and CR' are included in the multi-viewpoint images, the images may be selected. Actually, in most cases, the images of the ideal capturing positions are not included in the multi-viewpoint images. In such a case, one of combinations of images captured at capturing positions in the vicinity of the capturing positions CL' and CR' that satisfies predetermined conditions is selected as base images for a stereoscopic image.

Figure 6:
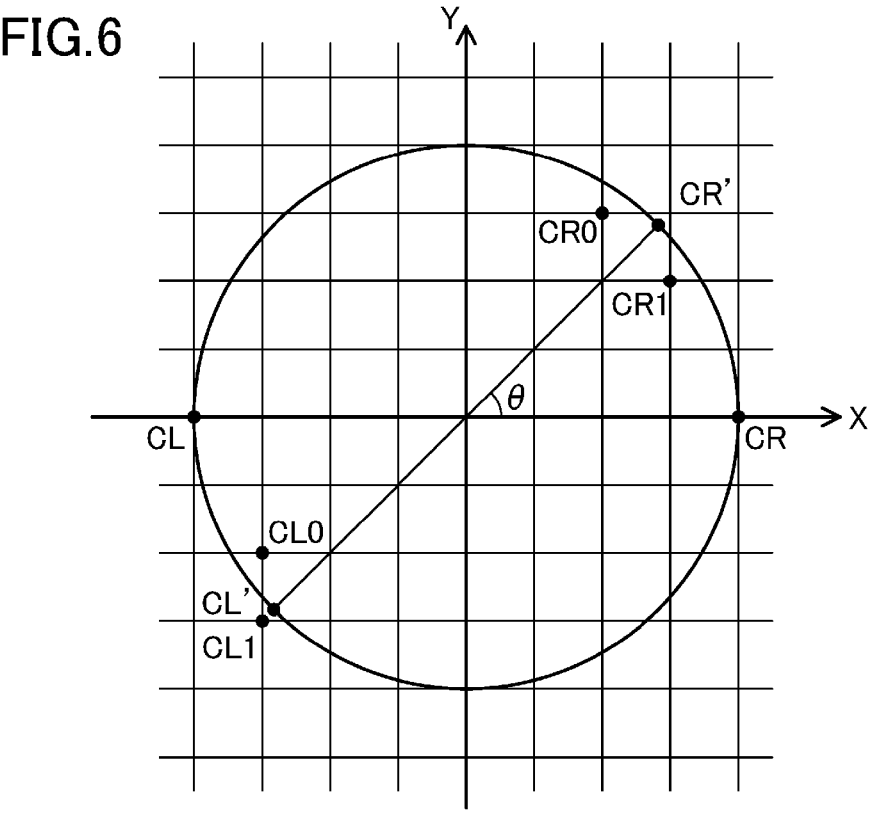
FIG. 6 is a conceptual diagram for describing a process for selecting suitable capturing positions.

(Step S303) As shown in FIG. 6, it is assumed that the multi-viewpoint image accumulation unit 103 stores images captured at capturing positions CL0 and CL1 in the vicinity of the capturing position CL' and images captured at capturing positions CR0 and CR1 in the vicinity of the capturing position CR'. In this case, the images captured at the capturing positions CL0 and CL1 are candidates for a left-eye image, and the images captured at the capturing positions CR0 and CR1 are candidates for a right-eye image.

The selection unit 102 selects one of the combinations of the capturing positions of the candidate images that satisfies predetermined conditions. Here, an axis CL'-CR' which is obtained by rotating the reference horizontal axis CL-CR by an angle of θ is used as a reference (horizontal axis). A combination of capturing positions whose difference in a direction perpendicular to the horizontal axis CL'-CR' is smaller than a predetermined value is assumed to be selected. The direction of the horizontal axis CL'-CR' corresponds to a parallax direction when a stereoscopic image after rotation is viewed. Therefore, here, a combination of images is selected of which difference of the capturing positions in a direction perpendicular to the parallax direction of the stereoscopic image after rotation falls within a predetermined range.

Specifically, the capturing positions CL0, CL1, CR0, and CR1 are rotated around the origin by an angle of −θ to calculate positions CL'0, CL'1, CR'0, and CR'1, respectively. For example, the position CR'0 (xCR'0, yCR'0) is represented with respect to the position CR0 (xCR0, yCR0) by:

$$\begin{pmatrix} xCR'0 \\ yCR'0 \end{pmatrix} = \begin{pmatrix} \cos(-\theta) & -\sin(-\theta) \\ \sin(-\theta) & \cos(-\theta) \end{pmatrix} \begin{pmatrix} xCR0 \\ yCR0 \end{pmatrix} = \begin{pmatrix} \cos\theta & \sin\theta \\ -\sin\theta & \cos\theta \end{pmatrix} \begin{pmatrix} xCR0 \\ yCR0 \end{pmatrix} \quad (3)$$

Thereafter, a combination of capturing positions which satisfies Expression (4) is selected:

$$|yCR'n - yCL'm| < T_h \quad (4)$$

where yCR'n (n=0, 1) is the y-coordinate of CR'n, yCL'm (m=0, 1) is the y-coordinate of CL'm, and Th is a predetermined threshold value.

(Step S304) The selection unit 102 performs the following branches (processes), depending on the number of the combinations selected in step S303. Specifically, if one or more combinations have been found, the selection unit 102 causes control to proceed to step S305. On the other hand, if no combination that satisfies the predetermined conditions has been found, the selection unit 102 causes control to proceed to step S307.

(Step S305) The selection unit 102 determines final capturing positions from the combinations selected in step S303. If there are a plurality of selected combinations of capturing positions, the selection unit 102 selects a more suitable combination of capturing positions, taking into consideration the magnitudes of the difference etc. of the capturing positions in the horizontal direction (the direction of the axis CL'-CR'). For example, a combination of capturing positions is selected whose difference in the horizontal direction is closer to the difference in the horizontal direction (X-axis direction) of the reference capturing positions CL and CR before rotation. By such selection, the change amount of the parallax between before and after rotation is reduced, whereby unnatural stereoscopic images after rotation can be reduced. On the other hand, if there is only one selected combination of capturing positions, the selection unit 102 determines the combination as final capturing positions.

(Step S306) The selection unit 102 outputs information about the finally determined capturing positions to the multi-viewpoint image accumulation unit 103. The multi-viewpoint image accumulation unit 103 selects images captured at the received capturing positions from the multi-viewpoint images, and outputs the selected images as a left-eye base image and a right-eye base image to the rotation unit 104. The selection unit 102 also calculates, from the finally determined capturing positions, a corrected angle by which the base images are to be rotated, and outputs the calculated corrected angle to the rotation unit 104.

(Step S307) If no combination of capturing positions which satisfies the predetermined conditions has been found in step S303, the selection unit 102 determines that a rotated stereoscopic image cannot be output, and returns an error signal. If the error signal is returned from the selection unit 102, the stereoscopic image generation device 100 does not display a stereoscopic image. Note that the stereoscopic image generation device 100 may respond to the error signal in other manners: (1) a warning that a stereoscopic image cannot be displayed is issued to the viewer; (2) a stereoscopic image is displayed while indicating that the displayed stereoscopic image is not appropriate; and the like, i.e., appropriate information may be displayed, depending on the operating conditions.

[Other Embodiments]

In the foregoing description, an embodiment of the technique disclosed herein has been illustrated. The present disclosure is not limited to this. The present disclosure is applicable to the embodiment to which changes, replacements, additions, deletions, etc. have been made. Therefore, other embodiments will be described hereinafter.

In the above embodiment, a combination of capturing positions whose difference in a direction perpendicular to a parallax direction after rotation falls within a predetermined range, is determined or selected. The present disclosure is not limited to this. Alternatively, for example, a combination of capturing positions which are closest to the capturing positions CR' (xR', yR') and CL' yL') which are obtained by rotating the reference capturing positions CR and CL by a predetermined rotation angle. Specifically, capturing positions CRn (xRn, yRn) and CLm (xLm, yLm) for which a value dn, m obtained by Expression (5) is smallest may be determined as the final capturing positions:

$$dn,m = \sqrt{(xRn-xR')^2 + (yRn-yR')^2} + \sqrt{(xLm-xL')^2 + (yLm-yL')^2} \quad (5)$$

As a result, changes in the capturing position spacing, the viewpoint position, etc. between before and after rotation can be reduced, whereby a natural rotation can be achieved. For example, in the example of FIG. 6, a combination of the capturing positions CL1 and CR1 which have the smallest distance to the ideal capturing positions CL' and CR' after rotation, is selected.

Figure 7:
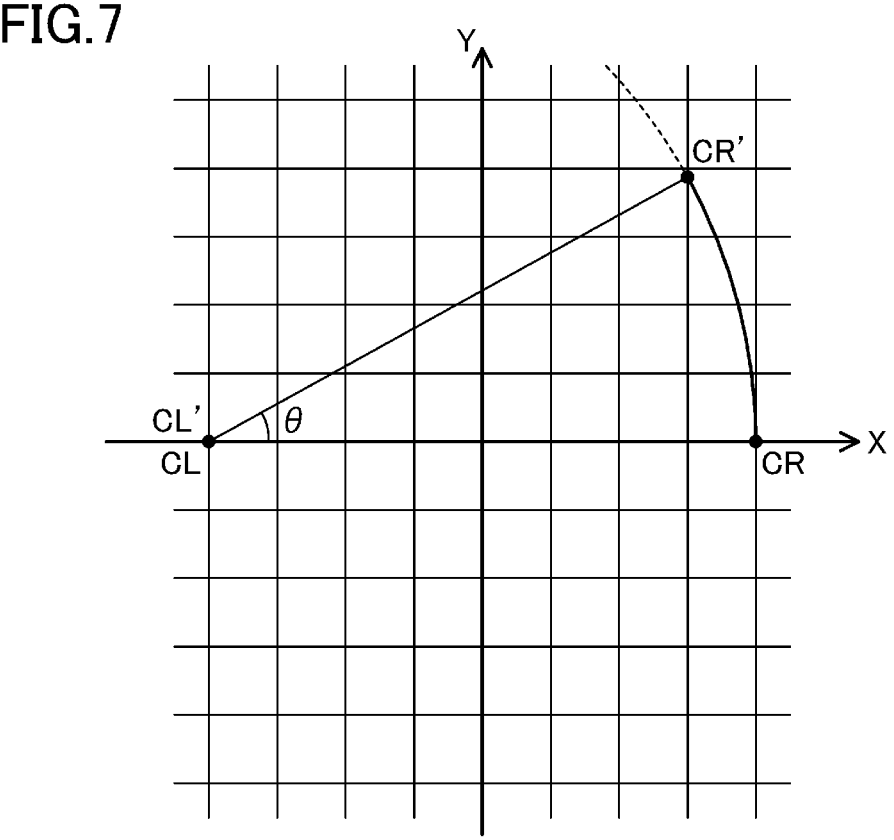
FIG. 7 is a conceptual diagram showing a rotation around a reference capturing position.

In the above embodiment, as an example, the reference capturing positions are rotated around the origin. The present disclosure is not limited to this. Alternatively, for example, as shown in FIG. 7, one (CR in FIG. 7) of the reference capturing positions is rotated around the other reference capturing position (CL in FIG. 7) to calculate the ideal capturing positions CL' and CR' after rotation. Alternatively, rotation may be made around any arbitrary positions.

In the above embodiment, the capturing positions of the multi-viewpoint images are located at the grid points as shown in FIG. 2. The present disclosure is not limited to this.

Figure 8:
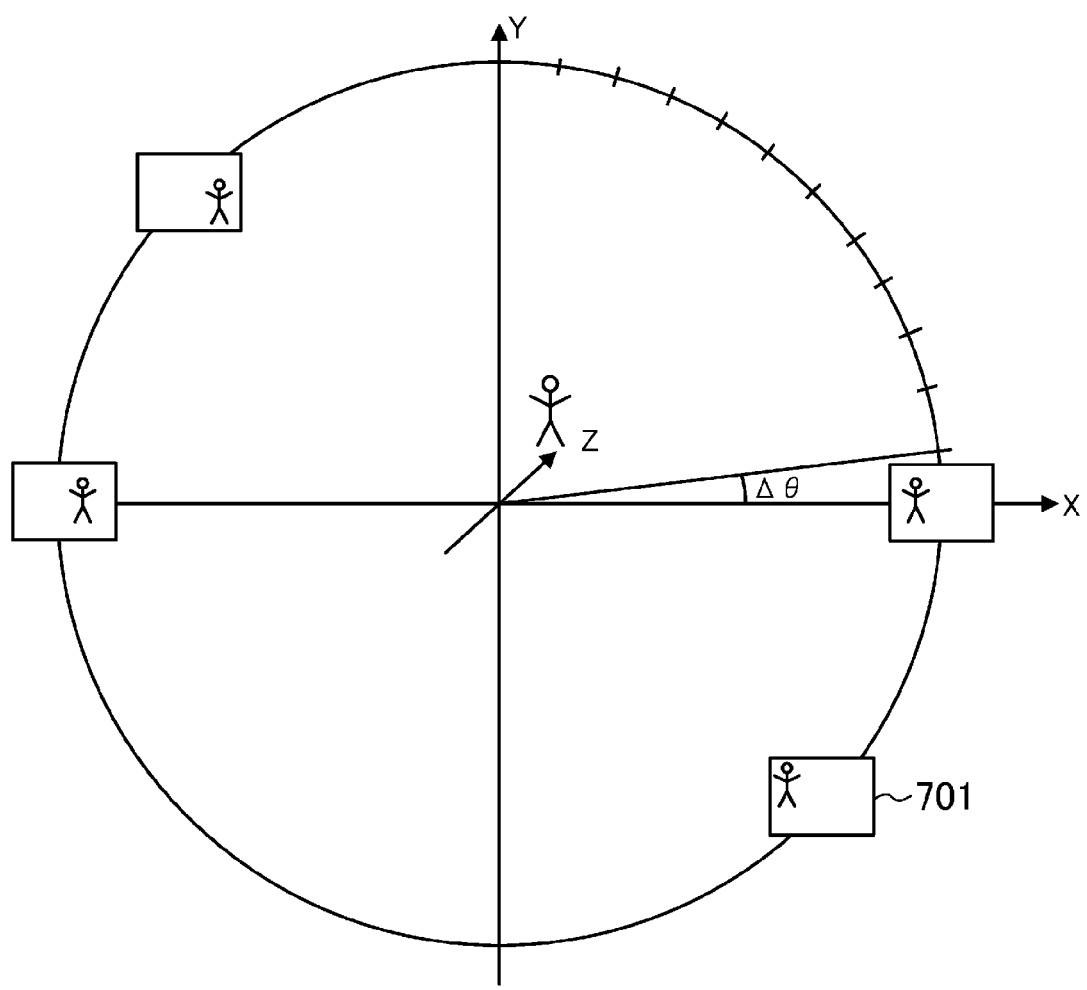
FIG. 8 is a diagram showing another example set of capturing positions of multi-viewpoint images.

FIG. 8 is a diagram showing another example of the capturing positions of the multi-viewpoint images. In the example of FIG. 8, a plurality of cameras 701 are placed in the XY plane facing a subject on the circumference of a circle whose center is the origin of the XY plane. The subject is placed at a position having a distance from the XY plane in the Z-axis direction (normal direction). All the cameras 701 faces in the same direction, i.e., the Z-axis direction. All images have the same horizontal axis extending in the X-axis direction, whereby the orientations of the cameras do not need to be stored in a database. Note that not all camera orientations need to be the same, however, in this case, information about the camera orientations needs to be stored in a database. The diameter of the circle may be, for example, 6.5 cm which is the pupillary distance for adults.

The cameras 701 may be, for example, equiangularly spaced by an angle of Δθ. The angle of Δθ may be arbitrarily determined. However, in order to achieve a more appropriate rotation of a stereoscopic image, the angle of Δθ is preferably reduced. If the rotation angle is an integral multiple of the angle of Δθ, then when the reference capturing positions are rotated around the origin as shown in FIG. 5, the capturing positions after rotation coincide with actual capturing positions. In this case, images captured at the coincident capturing positions may be used as base images for a stereoscopic image. On the other hand, if the rotation angle is not an integral multiple of the angle of Δθ, an appropriate combination of capturing positions may be selected by the above technique. Note that, in this case, in some threshold values Th of Expression (4), there may be no appropriate combination of capturing positions, and a stereoscopic image may not be able to be rotated.

The smaller the angle of Δθ, the finer the rotation angle by which the stereoscopic image generation device 100 can be rotated. On the other hand, the larger the angle of Δθ, the smaller the amount of the accumulated multi-viewpoint images.

In the examples of FIGS. 2 and 8, the capturing positions are equally or equiangularly spaced. The present disclosure is not limited to this. For example, if it is previously known that the frequency at which images are used is higher or lower at positions or angles within a predetermined range, the amount of images at the positions or angles having the higher frequency of use may be increased while the amount of images at the positions or angles having the lower frequency may be decreased. As a result, multi-viewpoint images can be more suitably and more efficiently accumulated, depending on the purpose of use of the stereoscopic image generation device.

In the above embodiment, all multi-viewpoint images are assumed to be obtained by capturing or shooting. The present disclosure is not limited to this. For example, instead of capturing images at all capturing positions, a plurality of images may be captured at coarsely selected capturing positions, and an image for a virtual capturing position between actual capturing positions may be generated and interpolated by performing image processing on the actually captured images.

In the above embodiment, a stereoscopic image is formed of two images, i.e., a left-eye image and a right-eye image. The present disclosure is not limited to this. Even if a stereoscopic image is formed of three or more images (e.g., five images), the above method is similarly applicable.

In another embodiment, the above process of the stereoscopic image generation device may be implemented by software which is executed by a processing device, such as a CPU, a DSP, etc. In this case, each component in the functional configuration diagram of FIG. 1 is implemented by a step in a processing algorithm.

In the foregoing description, embodiments of the technique disclosed herein have been illustrated. To do so, the accompanying drawings and the detailed description have been provided.

Therefore, the components described in the drawings and the detailed description may include not only components essential for achieving the present disclosure, but also non-essential components which are used to illustrate the above technique. Therefore, the non-essential components should not be immediately considered as being essential because those components are described in the drawings and the detailed description.

The above embodiments are for the purpose of illustration of the technique of the present disclosure, and therefore, various changes, replacements, additions, deletions, etc., can be made thereto within the scope of the claims or equivalents thereof.

According to the present disclosure, natural stereopsis can be provided when rotated versions of images are viewed. Therefore, the present disclosure is applicable, for example, to display devices, such as a television, a digital photo frame, and a mobile information terminal which display stereoscopic video.

What is claimed is:

1. A stereoscopic image generation device comprising:
   a multi-viewpoint image storage including a plurality of stored images, the plurality of stored images being images of a subject captured at different positions;
   a rotation angle obtaining unit configured to obtain a rotation angle at which a stereoscopic image of the subject is to be rotated around a line-of-sight direction;
   a selection unit configured to select two base images from the plurality of stored images, the two base images being determined based on the rotation angle; and
   a rotation unit configured to rotate the two base images at the rotation angle, thereby generating images which are to form the stereoscopic image of the subject rotated at the rotation angle,
   wherein the selection unit determines first capturing positions based on the rotation angle, and selects, from the plurality of stored images, the two base images captured at second capturing positions that are within a predetermined range from the first capturing positions in a direction perpendicular to a parallax direction in the stereoscopic image.

2. The stereoscopic image generation device of claim 1, wherein:
   the plurality of stored images are images captured at capturing positions provided in a plane facing the subject, and
   the capturing positions are placed in the plane on a circumference of a circle whose center is a reference point corresponding to a location of the subject.

3. The stereoscopic image generation device of claim 1, wherein:
   the plurality of stored images are images captured at capturing positions provided in a plane facing the subject, and
   the capturing positions are placed in the plane at grid points of a grid region including a reference point corresponding to a location of the subject.

4. The stereoscopic image generation device of claim 1, wherein
   the selection unit selects, from the plurality of stored images, the two base images of which the capturing positions are closest to positions obtained by rotating reference capturing positions by the rotation angle.

5. A stereoscopic image generation method comprising the steps of:
   obtaining a rotation angle at which a stereoscopic image of a subject is to be rotated around a line-of-sight direction;
   selecting a plurality of stored images which are images of the subject captured at different positions, the two base images being determined based on the obtained rotation angle; and
   rotating the selected two base images at the rotation angle, thereby generating images which are to form the stereoscopic image of the subject rotated at the rotation angle,
   wherein the selecting step includes determining first capturing positions based on the rotation angle, and selecting, from the plurality of stored images, the two base images captured at second capturing positions that are within a predetermined range from the first capturing positions in a direction perpendicular to a parallax direction in the stereoscopic image.

6. The stereoscopic image generation device of claim 1, wherein the first capturing positions are positions of left and right images of the stereoscopic image having a parallax inclined at the rotation angle.

* * * * *